US011876660B2

(12) United States Patent
Amuru et al.

(10) Patent No.: US 11,876,660 B2
(45) Date of Patent: Jan. 16, 2024

(54) METHOD AND SYSTEM FOR GENERATING A WAVEFORM IN A COMMUNICATION NETWORK (71) Applicants: WISIG NETWORKS PRIVATE LIMITED, Hyderabad (IN); INDIAN INSTITUTE OF TECHNOLOGY HYDERABAD (IITH), Sangareddy (IN)

(72) Inventors: Saidhiraj Amuru, Sangareddy (IN); Sibgath Ali Khan Makandar, Sangareddy (IN); Kiran Kumar Kuchi, Hyderabad (IN)

(73) Assignees: WISIG NETWORKS PRIVATE LIMITED; INDIAN INSTITUTE OF TECHNOLOGY HYDERABAD (IITH)

( * ) Notice: Subject to any disclaimer, the term of this patent is extended or adjusted under 35 U.S.C. 154(b) by 36 days.

(21) Appl. No.: 17/601,785

(22) PCT Filed: Sep. 25, 2020

(86) PCT No.: PCT/IN2020/050820
§ 371 (c)(1),
(2) Date: Oct. 6, 2021

(87) PCT Pub. No.: WO2021/059297
PCT Pub. Date: Apr. 1, 2021

(65) Prior Publication Data
US 2022/0182275 A1    Jun. 9, 2022

(30) Foreign Application Priority Data
Sep. 25, 2019 (IN) .............................. 201941038805

(51) Int. Cl.
H04L 27/26    (2006.01)

(52) U.S. Cl.
CPC ...... *H04L 27/2614* (2013.01); *H04L 27/2636* (2013.01)

(58) Field of Classification Search
CPC ............ H04L 27/2614; H04L 27/2636; H04L 27/2626; H04L 27/26265; H04L 27/2627;
(Continued)

(56) References Cited

U.S. PATENT DOCUMENTS 9,137,057 B2 *   9/2015  Eliaz ................. H04L 25/03834
10,003,489 B2 *  6/2018  Zeng .................. H04L 27/2614
(Continued)

FOREIGN PATENT DOCUMENTS

KR    20160089410 A    7/2016
WO    2018134838 A1    7/2018

OTHER PUBLICATIONS

Int'l Search Report and Written Opinion Appln No. PCT/IN2020/050820 dated Dec. 29, 2020.

*Primary Examiner* — Betsy Deppe
(74) *Attorney, Agent, or Firm* — McAndrews, Held & Malloy, Ltd.

(57) ABSTRACT

Embodiments of the present disclosure relate to system and method for generating a waveform in a communication network is disclosed. The method comprises determining precoder information using one of an indication from a base station and predetermined parameters corresponding to precoding. The predetermined parameters are one of coefficients of the precoding filter, and flatness requirement of the precoding filter. Also, the method comprises generating a sequence of output modulation symbols, wherein each output modulation symbol is obtained using a block of input data symbols and a lookup table. The lookup table is a function of the precoder information and predetermined modulation information. Next, the sequence of output modulation symbols is transformed using Discrete Fourier Trans- (Continued)

form to generate transformed output modulation symbols. Thereafter, mapping the transformed output modulation symbols using a plurality of subcarriers to generate a sub-carrier mapped symbols and processing the sub-carrier mapped symbols to generate a waveform.

18 Claims, 3 Drawing Sheets

(58) Field of Classification Search
CPC ............. H04L 27/2634; H04L 27/3411; H04L 25/03828; H04L 25/03834; H04L 25/03859
See application file for complete search history.

(56) References Cited

U.S. PATENT DOCUMENTS

| | | |
|---|---|---|
| 10,735,225 B2 * | 8/2020 | Kim .................. H04L 25/03834 |
| 2006/0256881 A1 | 11/2006 | Yonge, II et al. |
| 2010/0188984 A1 * | 7/2010 | Futagi ................. H04L 27/2614 370/252 |
| 2017/0134205 A1 * | 5/2017 | Kim .................... H04L 27/2623 |

* cited by examiner

METHOD AND SYSTEM FOR GENERATING A WAVEFORM IN A COMMUNICATION NETWORK

CROSS-REFERENCE TO RELATED APPLICATIONS

This application is a national stage application under 35 U.S.C. § 371 of application Serial No. PCT/IN2020/050820, filed on Sep. 25, 2020, and entitled "METHOD AND SYSTEM FOR GENERATING A WAVEFORM IN A COMMUNICATION NETWORK" which claims priority from the Indian Provisional Patent Application Numbers 201941038805, filed on Sep. 25, 2019, the entirety of which are hereby incorporated by reference. The aforementioned application is hereby incorporated herein by reference in its entirety.

TECHNICAL FIELD

Embodiments of the present disclosure are related, in general to communication, but exclusively relate to method and system for generating a waveform using a lookup table in a communication network.

BACKGROUND 5G new radio (NR) supports enhanced mobile broadband (eMBB), ultra-reliable-low-latency-communication (URLLC) and massive-machine-type-communication (mMTC) for frequency bands below 6 GHz, as well as above 6 GHz, including millimeter wave bands i.e. 20-40 GHz and 20-30 GHz.

As per the requirements, 5G needs a method of multiplexing control, data, and SRS signals using certain waveform. The 5G NR standard supports both Discrete Fourier Transform-Spread-Orthogonal frequency-division multiplexing (DFT-s-OFDM) based waveform and Orthogonal frequency-division multiplexing (OFDM) waveform for uplink. In the uplink transmission, multiple users can simultaneously transmit control information in the same time frequency resources. The users may be multiplexed in time, frequency or code domain. The user control information (UCI) may be 1 or 2 bits for the case of HARQ ACK/NACK, Scheduling Request (SR) etc., or more than 2 bits for the case of CQI, MIMO rank or other information. Generally, the control channel that carries 1- or 2-bits UCI is called short Physical Uplink Control Channel (PUCCH) and the one that carries more than 2 bits UCI is called long PUCCH. Similarly, the reference signals (RS) which are used for channel estimation may be multiplexed in time, frequency or code domain. Existing methods do not facilitate generation of a waveform that can transmit the signal at or near PA saturation power level.

Uplink of any cellular network is typically limited by power constraints. If OFDM is used for transmission, then due to high PAPR of this waveform, the power being transmitted must be backed off by some value to reduce and avoid nonlinearities. However, this will reduce coverage of this waveform based transmission and cell edge users cannot send signals properly To avoid this, a new waveform called DFT-s-OFDM waveform was used in LTE and also in 5G. Typically modulations used in this are QPSK, 16-QAM etc. However, the PAPR of these waveforms are around 4 dB value. This is still high. To further reduce, a new modulation scheme was introduced in 5G namely pi/2 BPSK. This has reduced the PAPR to about 3.5-4.0 dB.

To reduce this further, a technique called spectrum shaping or filtering was introduced. This brings down the PAPR to 1-2.0 dB with appropriate selection of "filtering" (this type of filtering is different from conventional filters and can be viewed as a form of data precoding in time or frequency domain) and even allows signal transmission near power amplifier (PA) saturation without significant reduction in receiver performance Similar filtering operation must be performed for the pilots or reference signals which are used for coherent demodulation of the data. For reference signals (RS), any sequence can be used and when passed through spectrum shaping, but through an appropriately selected sequence, the RS PAPR can made low. The filtering operation may also be referred to as precoding operation without loss of generality.

The pi/2-BPSK modulation scheme, when transmitted using Discrete Fourier transform-spread orthogonal frequency-division multiplexing (DFT-s-OFDM Waveform), offers low PAPR when compared to higher order modulation schemes including QPSK. Hence pi/2-BPSK modulation scheme is employed to carry the uplink data on physical uplink shared channel (PUSCH) and physical uplink control channel (PUCCH) in the 3GPP 5G NR. The demodulation reference signals (DMRS) are employed for coherent demodulation of the received data. The PAPR of both DMRS and data has to be similar and low in order to potentially allow for larger coverage.

The pi/2 BPSK waveform spectrum shaping can be done with multiple filters such as $1+D$, $1-D$, $0.28+D+0.28D^2$ and so on. The filters can also be represented as $[1\ 1]$, $[1\ -1]$ and $[0.28\ 1\ 0.28]$, $[-0.28\ 1\ -0.28]$ among others. The filter being used by the transmitter on the data must also be used on the RS if at all RS also supports spectrum shaping to enable proper demodulation at the receiver. Else, if the RS does not undergo spectrum shaping which is the case of ZC sequence based RS transmission, then the filter either must be specified ahead of time between the transmitter and receiver, or can be exchanged between transmitter and receiver in real time and the same will be used. Such filtering operations may need some changes in the baseband of the modem and not all modems may support this feature. So, based on whether a user equipment modem supports or not a feature, a base station (BS) may decide whether or not to schedule a user with this modulation scheme. To achieve this, the UE modem which supports this feature should first indicate that it can be scheduled with this modulation scheme during real time operation. Upon receiving such a confirmation, the BS scheduler will make a note of the same and when it seems appropriate during regular scheduling procedure may ask the UE to activate this modulation scheme.

Also, the BS must support a receiver architecture for the demodulation of this modulation scheme. If the BS does not support demodulation of the modulation scheme despite the UE modem's support, then the BS may choose not to activate the modulation scheme for that specific user. In such case, the UE coverage will be limited by the QPSK modulation scheme which is the next best modulation scheme that can be used in 5G NR specifications. Also, the BS cannot wrongly activate pi/2 BPSK feature for a UE which does not support this modulation scheme as the entire receiver will not work. To ensure this technique, a 2-way signaling mechanism is required between the BS and UE to agree whether each node supports the pi/2 BPSK feature and if they do, then it can be activated as the situation demands.

Once the method of transmission is agreed between the transmitter and the receiver, there are several ways to implement this transmission using circular convolution, frequency domain spectrum shaping and novel look-up table-based methods. However, there needs a novel method to reduce the complexity of implementation of such a transmission where precoding is employed to reduce the PAPR of the waveform.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure method for generating a waveform in a communication network is disclosed. The method comprises determining, by a transmitter, precoder information using one of an indication from a base station (BS) and predetermined parameters corresponding to precoding. Also, the method comprises generating a sequence of output modulation symbols, wherein each output modulation symbol is obtained using a block of input data symbols and a lookup table. The lookup table is a function of the precoder information and pre-determined modulation information. Further, the method comprises transforming the sequence of output modulation symbols using Discrete Fourier Transform (DFT) to generate transformed output modulation symbols. Furthermore, the method comprises mapping the transformed output modulation symbols using a plurality of subcarriers to generate a sub-carrier mapped symbols and processing the sub-carrier mapped symbols to generate a waveform.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

Embodiments of the present disclosure are related, in general to communication, but exclusively relate to method and system for generating, transmitting and signaling a user to use a waveform having low peak-to-average power ratio (PAPR). The system, also referred to as a transmitter, receives an input data and transmit a generated waveform to another communication system. The input data is a bit sequence corresponding to data from higher layers. This bit sequence is first mapped to a modulation scheme such as BPSK, pi/2 BPSK, QPSK, or any M-QAM modulation scheme. To reduce the PAPR of the waveform, this modulation output may be precoded in time domain or in frequency domain using a precoding filter which is indicated by the base station to the transmitter or pre-determined by the user equipment. Alternately, as discussed in the embodiments of this invention, the bit sequence can be mapped to an output using a look up table which is determined based on the modulation scheme, and the precoding filter being used at the transmitter. The output of this operation is transformed into DFT output data using DFT operation. The DFT output data is then mapped with subcarriers to generate the sub-carrier mapped DFT data and modulated using Orthogonal Frequency Division Multiplexing (OFDM) modulation to generate the waveform with low PAPR.

One example methodology is shown using the π/2-BPSK modulation. In the π/2-BPSK modulation, data symbols or bit b(i) is mapped to complex-valued modulation symbol d(i) according to $$d(i) = \frac{e^{j\frac{\pi}{2}(i \bmod 2)}}{\sqrt{2}}[(1-2b(i)) + j(1-2b(i))] \quad (1)$$

where π/2-BPSK modulation is used. Consider a filter [1 1] is used, then the output modulation symbols are generated as x (1)=d (1)+d (N); x (2)=d (2)+d (1), . . . x (N)=d (N)+d (N−1), where N is the length of the data sequence. This operation performs 1+D precoding in the time domain before DFT precoding. However, 1+D precoding may also be performed in frequency domain as frequency domain shaping wherein, the data symbols d(i) will be passed through a DFT operation and then multiplied with the frequency response of the [1 1] filter. This method is also applicable for other modulation schemes and other filters. The complexity of this method is high so a low complexity method as follows is disclosed in the present disclosure.

Figure 1:
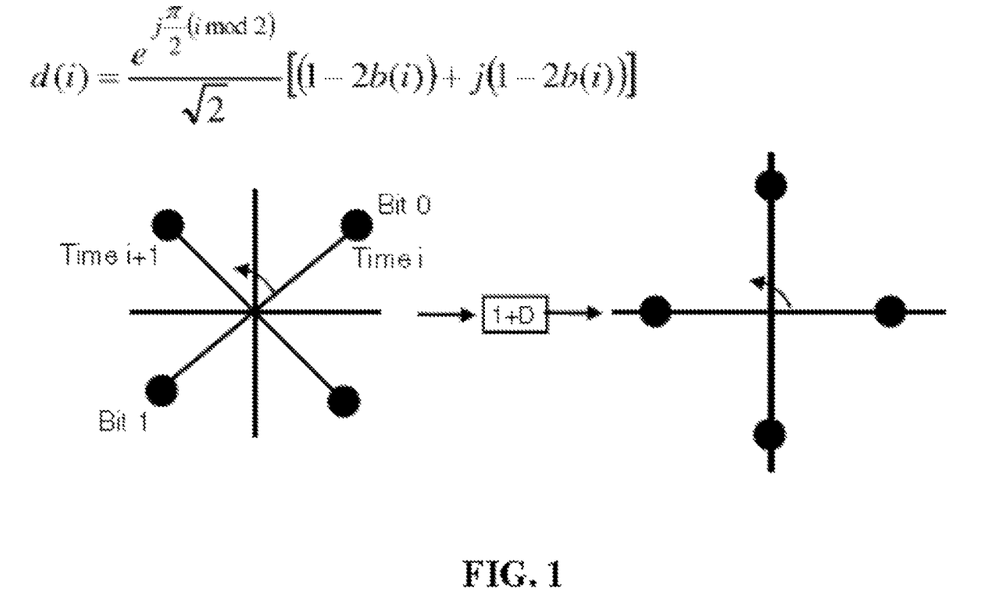
FIG. 1 shows an illustration of a method to perform 1+D precoding over pi/2 BPSK data, in accordance with an embodiment of the present disclosure.

In an embodiment, a method to perform 1+D precoding over pi/2 BPSK data is via a look up table LUT as shown in Table-1 and FIG. 1. Specifically, a bit sequence or data sequence b(i) are taken and directly map them to the output of the precoding operation using look up tables. This is shown via examples below for pi/2 BPSK modulation and 1+D or 1−D precoding.

TABLE-1

| LUT for 1 + D precoding | | |
|---|---|---|
| Bit K | Bit K − 1 | Output |
| 0 | 0 | 1j |
| 1 | 1 | −1j |
| If K is even, | | |
| Bit K | Bit K − 1 | Output |
| 0 | 1 | 1 |
| 1 | 0 | −1 |
| If K is odd, | | |
| Bit K | Bit K − 1 | Output |
| 0 | 1 | −1 |
| 1 | 0 | 1 |

Figure 2:
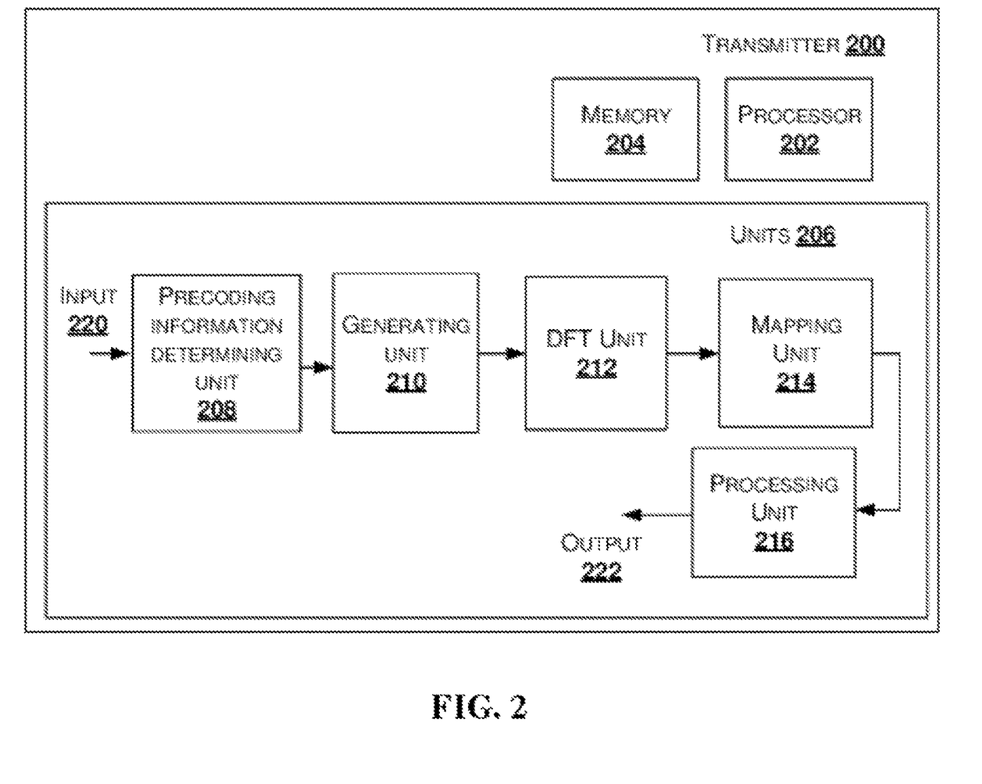
FIG. 2 shows a block diagram of a transmitter for generating a waveform by a transmitter in a communication network, in accordance with an embodiment of the present disclosure.

In an embodiment, a method to perform 1-D precoding over pi/2 BPSK data is via a look up table LUT as shown in Table-1 and FIG. 2.

TABLE-2

| LUT for 1 − D precoding | | |
|---|---|---|
| Bit K | Bit K − 1 | Output |
| 0 | 1 | 1j |
| 1 | 0 | −1j |
| If K is even, | | |
| Bit K | Bit K − 1 | Output |
| 0 | 0 | 1 |
| 1 | 1 | −1 |

TABLE-2-continued

| LUT for 1 − D precoding | | |
|---|---|---|
| If K is odd, | | |
| Bit K | Bit K − 1 | Output |
| 0 | 0 | −1 |
| 1 | 1 | 1 |

FIG. 1 shows an illustration of a method to perform 1+D precoding over pi/2 BPSK data, in accordance with an embodiment of the present disclosure. Note that the block of the symbols taken from bit sequence into the look up table depends on modulation scheme and also the length of the precoding filter. For instance, when QPSK modulation is used, 4 bits are used at a time, since 2-bits map to 1 modulation symbol and the other 2-bits map to another modulation symbol. Now the 1+D precoding operation considers the present and past symbols for precoding. Similarly, if a 3 tap filter were to be used as precoding filter, then present and past 2 symbols would be used in which case 6 bits form the bit sequence b(i) would have to be used to form the look up table.

A generic lookup table looks as below

| Bit position K | Bit position K-1 | Bit position K-2 | Bit position K-3 | Bit position K-4 | Bit position K-5 | Bit position K − M * . . . N + 1 | Output of the precoding operation |
|---|---|---|---|---|---|---|---|
| 0/1 | 0/1 | 0/1 | 0/1 | 0/1 | 0/1 | . . . 0/1 | Complex symbol |

In the above table, M is the modulation order and N is the precoding filter length. M and N are inputs to be known to the transmitter based on the modulation scheme and the precoding filter.

FIG. 2 shows a block diagram of a transmitter for generating a waveform in a communication network, in accordance with an embodiment of the present disclosure.

As shown in FIG. 2, the transmitter 200 comprises a processor 202, and a memory 204 coupled with the processor. The transmitter 200 may also be referred as a communication system. The processor may be configured to perform one or more functions of the communication system 200 for receiving input data and generate waveform with at least one of low PAPR, reduced power and enhance coverage, for transmitting to a receiver. The transmitter is a user equipment (UE) transmitter which generates a waveform and transmits the generated waveform to a base station (BS). In one implementation, the transmitter 200 may comprise units, also referred to as modules or blocks 206, for performing various operations in accordance with the embodiments of the present disclosure.

The unit 206 includes a precoding information determining unit 208, a generating unit 210, A Discrete Fourier transform (DFT) unit 212, a mapping unit 214 and a processing unit 216. In an embodiment, the transmitter 200 is configured to generate input data symbols 220.

The precoding information determining unit 208 of the transmitter 200 determines precoder information using one of an indication from a base station (BS) and predetermined parameters corresponding to precoding 220, which is an input to the transmitter 200. The predetermined parameters corresponding to precoding are one of coefficients of the precoding filter and flatness requirement of the precoding filter.

The generating unit 210 generates a sequence of output modulation symbols. Each output modulation symbol is obtained using a block of input data symbols and a lookup table, said lookup table is a function of the precoder information and pre-determined modulation information. The modulation performed on the input one symbols is one of binary phase shift keying (BPSK), quadrature phase shift keying (QPSK), pi/2 BPSK, or M-QAM. The precoder information indicates performing a precoding operation using one of the filters with coefficients [1 1], [1 −1], [0.28 1 0.28], and [−0.28 1 0.28]. The precoder or precoding filter is one of 1+D, 1−D, $0.26D^{-1}+0.92+0.26D$, and $-0.26D^{-1}+0.92-0.26D$, where D is a delay element.

The block of input data size is at least two, wherein the block comprises a present input data symbol and past input data symbols. The past input data symbols are also referred as previous input data symbols, and comprises a last input data symbol and other input data symbols. The output modulation symbols comprises a first output modulation symbol, last modulation symbol and other modulation symbols. A block is formed for the first output modulation symbol using the present input data symbol and a last input data symbol for a 2-tap precoding filter when the modulation information corresponds to one of BPSK and pi/2 BPSK. A block is formed, for the other output symbols, using two consecutive input data symbols for a 2-tap precoding filter when the modulation information corresponds to one of BPSK and pi/2 BPSK.

In an embodiment, the block is formed for the first output modulation symbol using the present M input data symbols and last (N−1)*M input data symbols for a N-tap precoding filter, when the modulation information corresponds to M-ary Quadrature Amplitude Modulation (QAM), where M is number of constellation points. Also, the block for the other output symbols is formed by using N*M consecutive input data symbols for a N-tap precoding filter when the modulation information corresponds to M-ary QAM.

In an embodiment, a rotation operation is applied on the block of input data symbols, and the rotation is a constellation rotation where successive samples of the input symbols are rotated by 90 degrees. That is a $j^k$ rotation on the input data symbols i.e., on the M-length BPSK to generate a rotated data symbols following by the precoding operation of the rotated data symbols. The precoder or precoding filter is one of 1+D, 1−D, $0.26D^{-1}+0.92+0.26D$, and $-0.26D^{-1}+0.92-0.26D$, where D is a delay element.

In an embodiment, considering time domain, the precoder is also referred as a data filter which may be one of two-tap filter or multi-tap filter. The taps have equal magnitude values for two tap filter, in an embodiment. The taps have a symmetric shape for multi-tap filter, in an embodiment. The precoder reduces PAPR of the output waveform significantly. In an embodiment, the precoder or data filter performs circular convolution on the rotated data to produce a filtered data, which is fed for further processing.

The DFT unit 212 transforms the sequence of output modulation symbols using a Discrete Fourier transform (DFT) to generate transformed output modulation symbols which are frequency domain symbols. Also, in an embodiment, the frequency domain symbols may be filtered using a filter to obtain a filtered frequency domain symbol.

The mapping unit 214 is also referred as a subcarrier mapping unit. The mapping unit 214 performs mapping of the transformed output modulation symbols received from the DFT unit 212, using a plurality of subcarriers to generate a sub-carrier mapped symbols.

Also, the mapping unit 214 may be a subcarrier mapping and distributed subcarrier allocation unit configured to receive the transformed output symbols or precoded data, and perform allocation of distributed subcarriers which are evenly spaced with in the allocated resource block of a length M. For example, if U users are frequency multiplexed, then there are U−1 null tones between successive data subcarriers. In this example, U users may be frequency multiplexed where each user has a different starting position in subcarrier mapping. In an embodiment, the user data may comprise of at least one of data, control information and reference signals.

The processing unit 216 processes the sub-carrier mapped symbols, received from the mapping unit 214, to generate a waveform. The processing the sub-carrier mapped symbols comprises performing Inverse Fast Fourier Transform (IFFT) on the mapped signal to produce a time domain waveform. In an embodiment, the IFFT unit may be an inverse DFT. In an embodiment, generating the waveform is performed using Orthogonal Frequency Division Multiplexing (OFDM) modulation on the sub-carrier mapped symbols. Also, a cyclic prefix (CP) operation may be performed on the time domain waveform to generate an output waveform. The generated waveform comprises at least one of optimized peak to average power ratio (PAPR), optimized cross correlation and optimized error-rate performance on every port of the transmitter.

In an embodiment, after the IFFT operation, at least one of CP addition, windowing, weighted overlap add (WOLA) and filtering operations are performed on the time domain signal waveform to generate an output sequence or a waveform.

Embodiments of the present disclosure also relate to methods and systems of generating and transmitting a pi/2 BPSK waveform from a user equipment (UE) or user to the BS in the uplink direction. The methods specifically disclose the enhancements needed for enabling such a waveform, over and top of the standard specifications for 5G NR. The changes include signaling, design of waveform and performance analysis checks in layer-1, layer-2 and radio frequency conformance parts of the standard specification.

In an embodiment, the reference signals (RS) may be filtered or unfiltered. They must be specified in the specification. In addition, this may be achieved by providing higher layer signaling mechanisms such as "filter-on-off-for-RS" wherein if this field is enabled, the receiver assumes that the user applies shaping filter on the reference signal and if this is disabled, the reference signal is decoded as it is. This decoded reference signal is further used for demodulation of the data signals. For example, the RS is a constant amplitude sequence in the frequency domain and It is mapped to an appropriate comb or an antenna port. The RS sequence may a so be one of computer generated sequence, Zadoff Chu sequence, PN sequence or any complex sequence which is designed with good PAPR, and correlation characteristics.

Figure 3:
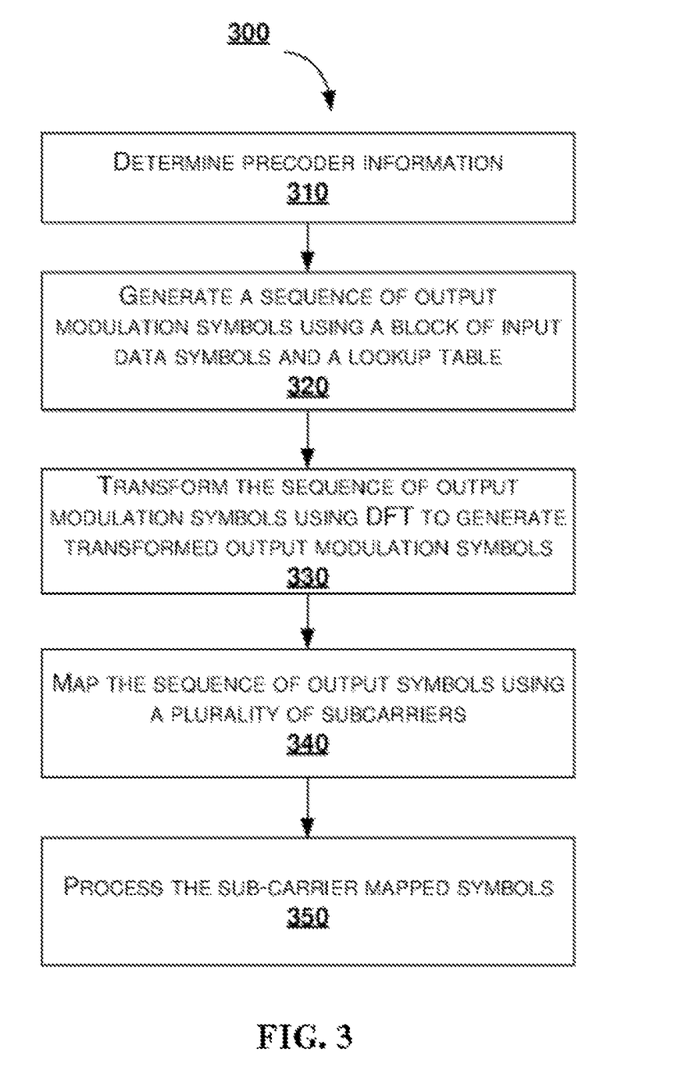
FIG. 3 shows a flowchart illustrating a method for generating a waveform by a transmitter in a communication network, in accordance with some embodiments of the present disclosure.

FIG. 3 shows a flowchart illustrating a method for generating a waveform by a transmitter in a communication system, in accordance with an alternative embodiments of the present disclosure.

As illustrated in FIG. 3, the method 300 comprises one or more blocks for generating a waveform in a communication system. The generated waveform has an optimized PAPR and optimized auto-correlation and cross-correlation. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 310, determining precoder information is performed by the transmitter using one of an indication from a base station (BS) and predetermined parameters corresponding to precoding. The predetermined parameters corresponding to precoding are one of coefficients of the precoding filter and flatness requirement of the precoding filter.

At block 320, generate a sequence of output modulation symbols performed by the generating unit 110. Each output modulation symbol is obtained using a block of input data symbols and a lookup table, said lookup table is a function of the precoder information and pre-determined modulation information. In an embodiment, the input data symbols are rotated and modulated. The modulation performed on the input one symbols is one of binary phase shift keying (BPSK), quadrature phase shift keying (QPSK). The precoder information indicates performing a precoding operation using one of the filters with coefficients [1 1], [1 −1], [0.28 1 0.28], and [−0.28 1 0.28]. The precoder or precoding filter is one of 1+D, 1−D, $0.26D^1+0.92+0.26D$, and $-0.26D^{-1}+0.92-0.26D$, where D is a delay element.

The block of input data size is at least two, wherein the block comprises a present input data symbol and past input data symbols. The past input data symbols are also referred as previous input data symbols, and comprises a last input data symbol and other input data symbols. The output modulation symbols comprises a first output modulation symbol, last modulation symbol and other modulation symbols. A block is formed for the first output modulation symbol using the present input data symbol and a last input data symbol for a 2-tap precoding filter when the modulation information corresponds to one of BPSK and pi/2 BPSK. A block is formed for the other output symbols the block using two consecutive input data symbols for a 2-tap precoding filter when the modulation information corresponds to one of BPSK or and pi/2 BPSK.

In an embodiment, the block is formed for the first output modulation symbol using the present M data symbols and last (N−1)*M data symbol for a N-tap precoding filter, when the modulation information corresponds to M-ary Quadrature Amplitude Modulation (QAM), where M is number of constellation points. The block for the other output symbols is formed using N*M consecutive data symbols for a N-tap precoding filter when the modulation information corresponds to M-ary QAM.

In an embodiment, a rotation operation is applied on the block of input data symbols, and the rotation is a constellation rotation where successive samples of the input symbols are rotated by 90 degrees. That is a $j^k$ rotation on the input data symbols i.e., on the M-length BPSK to generate a rotated data symbols following by the precoding operation of the rotated data symbols. The precoder or precoding filter is one of 1+D, 1−D, $0.26D^{-1}+0.92+0.26D$, and $-0.26D^{-1}+0.92-0.26D$, where D is a delay element.

At block 330, transforming, by the transmitter, the sequence of output modulation symbols using Discrete Fourier Transform (DFT) to generate transformed output modulation symbols.

At block 340, mapping the transformed output modulation symbols using a plurality of subcarriers to generate a sub-carrier mapped symbols.

At block 350, processing, by the transmitter, the sub-carrier mapped symbols to generate a waveform. Processing the sub-carrier-mapped symbols comprises performing Inverse Fast Fourier Transform (IFFT) on the mapped signal to produce a time domain waveform. In an embodiment, generating the waveform is performed using Orthogonal Frequency Division Multiplexing (OFDM) modulation on the sub-carrier mapped symbols. Also, a cyclic prefix (CP) operation may be performed on the time domain waveform to generate an output waveform. The generated waveform comprises at least one of an optimized peak to average power ratio (PAPR), optimized cross correlation and optimized error-rate performance on every port of the transmitter.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method, the method comprising:
   determining, by a transmitter, precoder information using one of an indication from a base station (BS) and pre-determined parameters corresponding to precoding;
   generating, by the transmitter, a sequence of output modulation symbols, wherein each output modulation symbol is obtained using a block of input data symbols and a lookup table, said lookup table is a function of the precoder information and pre-determined modulation information;
   transforming, by the transmitter, the sequence of output modulation symbols using Discrete Fourier Transform (DFT) to generate transformed output modulation symbols;
   mapping, by the transmitter, the transformed output modulation symbols using a plurality of subcarriers to generate sub-carrier mapped symbols; and
   processing, by the transmitter, the sub-carrier mapped symbols to generate a waveform.

2. The method as claimed in claim 1, wherein a size of the block is at least two input data symbols, wherein the block comprises at least one present input data symbol and at least one past input data symbol.

3. The method as claimed in claim 2, wherein the block is formed for a first output modulation symbol using one present input data symbol and one past input data symbol for a 2-tap precoding filter when the pre-determined modulation information corresponds to one of BPSK and pi/2 BPSK.

4. The method as claimed in claim 2, wherein the block is formed for the first output modulation symbol using M present input data symbols and (N−1)*M past input data symbols for an N-tap precoding filter when the pre-determined modulation information corresponds to M-ary Quadrature Amplitude Modulation (QAM), said M is number of constellation points.

5. The method as claimed in claim 4, wherein the block is formed for the other output modulation symbols using N*M consecutive input data symbols for a N-tap precoding filter, when the pre-determined modulation information corresponds to M-ary QAM.

6. The method as claimed in claim 1, wherein the block is formed for other output modulation symbols using two consecutive input data symbols for a 2-tap precoding filter when the pre-determined modulation information corresponds to one of BPSK and pi/2 BPSK.

7. The method as claimed in claim 1, wherein the pre-determined parameters corresponding to precoding are one of coefficients of a precoding filter, and flatness requirement of the precoding filter.

8. The method as claimed in claim 1, wherein the precoder information indicates performing a precoding operation using a filter with one of a first set of coefficients, a second set of coefficients, a third set of coefficients, and a fourth set of coefficients.

9. The method as claimed in claim 1, wherein processing the sub-carrier mapped symbols comprises performing Inverse Fast Fourier Transform (IFFT) on the sub-carrier mapped symbols to produce a time domain waveform.

10. A transmitter, the transmitter comprising:
    a precoder configured to determine precoder information according to one of an indication from a base station (BS) and one or more pre-determined parameters;
    a modulator configured to generate a sequence of output modulation symbols according to a block of input data symbols, the precoder information and pre-determined modulation information;
    a Discrete Fourier Transform (DFT) circuit configured to transform the sequence of output modulation symbols to generate transformed output modulation symbols; and
    a mapping circuit configured to map the transformed output modulation symbols using a plurality of subcarriers to generate sub-carrier mapped symbols.

11. The transmitter as claimed in claim 10, wherein the block of input data symbols comprises at least one present input data symbol and at least one past input data symbol.

12. The transmitter as claimed in claim 10, wherein:
    the modulator is configured to generate a first output modulation symbol of the sequence of output modulation symbols;
    the block of input data symbols comprises one present input data symbol;
    the block of input data symbols further comprises a last input data symbol for a 2-tap precoding filter of the modulator; and
    the pre-determined modulation information corresponds to one of BPSK and pi/2 BPSK.

13. The transmitter as claimed in claim 10, wherein:
    the modulator is configured to generate one or more modulation symbols after a first output modulation symbol of the sequence of output modulation symbols;
    the block of input data symbols comprises two consecutive input data symbols for a 2-tap precoding filter of the modulator; and
    the pre-determined modulation information corresponds to one of BPSK and pi/2 BPS K.

14. The transmitter as claimed in claim 10, wherein:
    the modulator is configured to generate a first output modulation symbol of the sequence of output modulation symbols;
    the block of input data symbols comprises M present input data symbols;
    the block of input data symbols comprises (N−1)*M last input data symbols for a N-tap precoding filter of the modulator;
    the pre-determined modulation information corresponds to Mary Quadrature Amplitude Modulation (QAM); and
    M is number of constellation points.

15. The transmitter as claimed in claim 10, wherein:
    the modulator is configured to generate one or more modulation symbols after a first output modulation symbol of the sequence of output modulation symbols;
    the block of input data symbols comprises N*M consecutive input data symbols for a N-tap precoding filter of the modulator;
    the pre-determined modulation information corresponds to M-ary Quadrature Amplitude Modulation (QAM); and
    M is number of constellation points.

16. The transmitter as claimed in claim 10, wherein the one or more pre-determined parameters are one of coefficients of a precoding filter, in the modulator, and a flatness requirement of the precoding filter, in the modulator.

17. The transmitter as claimed in claim 10, wherein the precoder information indicates performing a precoding operation using a filter, of the modulator, with one of a first set of coefficients, a second set of coefficients, a third set of coefficients, and a fourth set of coefficients.

18. The transmitter as claimed in claim 10, wherein the transmitter further comprises:
   an Inverse Fast Fourier Transform (IFFT) circuit configured to transform the sub-carrier mapped symbols to produce a time domain waveform.

\* \* \* \* \*